United States Patent

Spoto

Patent Number: 5,732,969
Date of Patent: Mar. 31, 1998

[54] DIRECT PULL DUAL COMPENSATING STABILIZER SYSTEM

[75] Inventor: Louis M. Spoto, Sleepy Hollow, Ill.

[73] Assignee: Illinois Tool Works Inc., Glenview, Ill.

[21] Appl. No.: 689,881

[22] Filed: Aug. 15, 1996

[51] Int. Cl.[6] ............................. B60G 21/05
[52] U.S. Cl. ............ 280/689; 280/673; 280/772; 267/183
[58] Field of Search .................... 280/689, 772, 280/663, 671, 673, 675, 660, 666, 688, 716, 726, 725, 690, 691, 112.1; 267/183, 257

[56] References Cited

U.S. PATENT DOCUMENTS

| | | | |
|---|---|---|---|
| 1,223,486 | 4/1917 | Forstrom | 280/840 |
| 2,045,028 | 6/1936 | Sellman | 280/716 |
| 2,643,897 | 6/1953 | Chowning | 280/666 |
| 2,755,100 | 7/1956 | Giacosa | 280/716 |
| 2,840,387 | 6/1958 | Orlandi | 280/104 |
| 2,950,122 | 8/1960 | Erickson | 280/104 |
| 2,969,246 | 1/1961 | Erickson | 280/703 |
| 3,116,938 | 1/1964 | Stron | 280/112.1 |
| 3,459,436 | 8/1969 | Rusconi | 280/104 |
| 5,215,329 | 6/1993 | Santo | 280/689 |
| 5,382,034 | 1/1995 | Parker et al. | 280/104 |

FOREIGN PATENT DOCUMENTS

| | | | |
|---|---|---|---|
| 0 319 391 | 6/1989 | European Pat. Off. | 280/772 |
| 2 616 715 | 12/1988 | France | 280/688 |
| 5-85140 | 4/1993 | Japan | 280/689 |

*Primary Examiner*—Peter C. English
*Attorney, Agent, or Firm*—Schwartz & Weinrieb

[57] ABSTRACT

A stabilizer system is designed for an automotive vehicle having a suspension including left and right suspension components, each of which suspension components rotates about a predetermined axis of rotation in response to movement of a portion of a vehicle body located above the suspension component in the generally upward and downward direction relative to wheels of the vehicle. The stabilizer system includes elongate flexible members which tensionably link first and second attachment points operatively coupled to each of the suspension components, which attachment points are located generally above and below the axis of rotation of the suspension component. The first elongate flexible member is operatively coupled to and extends between the one of the attachment points located above the axis of rotation of the left suspension component and the one of the attachment points located below the axis of rotation of the right suspension component, and the second elongate flexible member is operatively coupled to and extends between the one of the attachment points located below the axis of rotation of the left suspension component and the one of the attachment points located above the axis of rotation of the right suspension component. Each of the elongate flexible members passes freely and unobstructed between its operative connections to the respective attachment points.

20 Claims, 2 Drawing Sheets

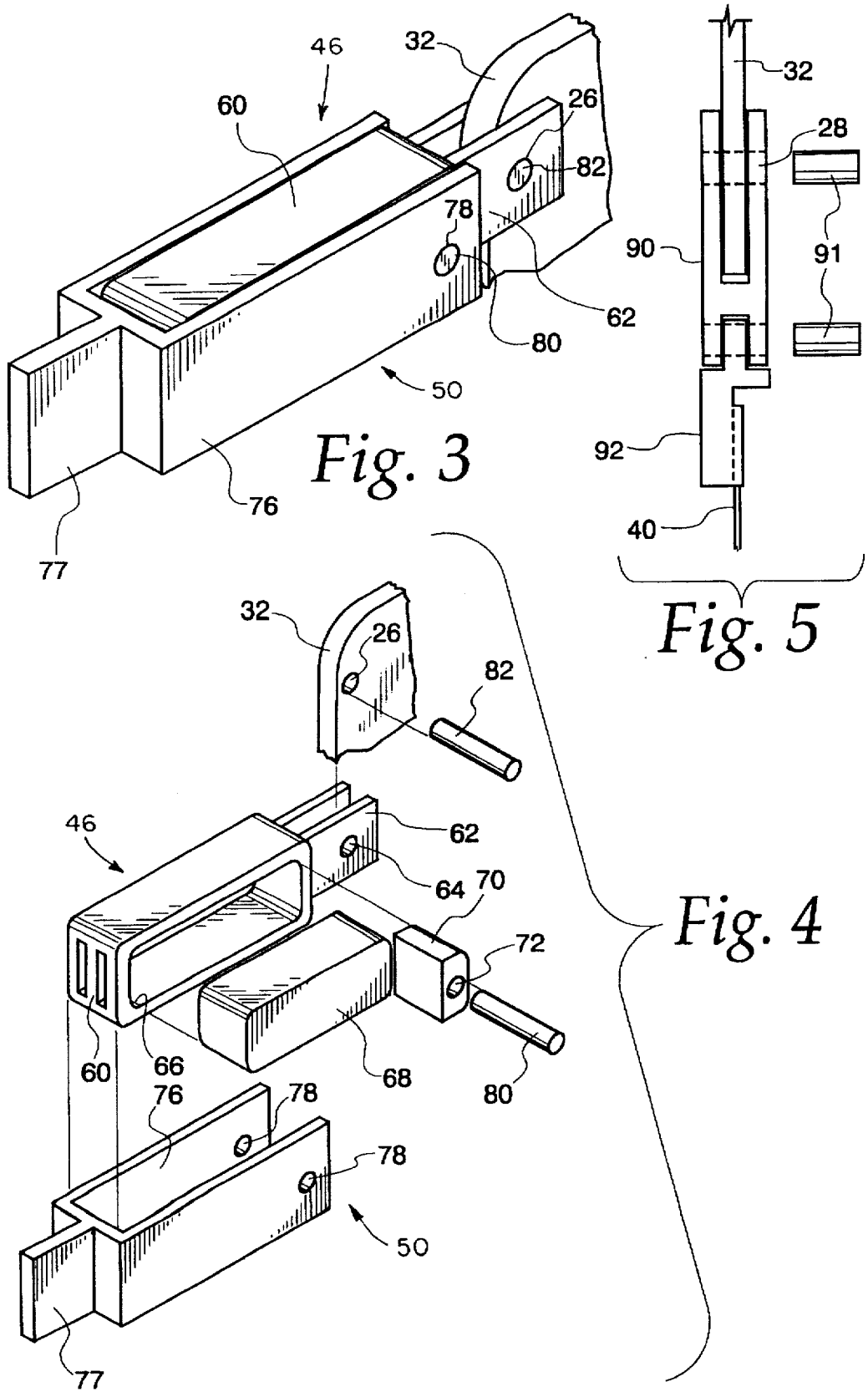

DIRECT PULL DUAL COMPENSATING STABILIZER SYSTEM

FIELD OF THE INVENTION

The present invention relates to a stabilizer system for use with an automotive vehicle, and more particularly, the invention relates to a stabilizer system which will help to control vehicle understeer/oversteer characteristics, by acting directly upon vehicle suspension components.

BACKGROUND OF THE INVENTION

Many arrangements for controlling vehicle understeer or oversteer have been proposed. Such arrangements often include such elements as anti-roll bars or stabilizer bars to help control vehicle body roll during turning maneuvers. Such anti-roll bars generally work by transferring vehicle weight from the inside wheel to the outside wheel during a turn. However, the anti-roll bar is a relatively heavy element.

The stabilizer system described herein may also be configured in such a way as to help to control vehicle oversteer and understeer. Generally speaking, the terms oversteer and understeer are used herein to refer to the following situations. In an understeer situation, the vehicle does not turn as sharply as expected in response to turning of the steering wheel. This generally occurs when there is insufficient traction in the front tires of the vehicle to follow the turning radius dictated by the position of the steering wheel. However, such understeering is generally relatively easy for most drivers to compensate for and tends to occur relatively slowly during a turn, rather than as a quick and unexpected movement of the vehicle.

On the other hand, oversteer occurs when the vehicle turns more sharply than expected. Such an oversteer situation usually occurs due to a loss of traction of the rear tires, causing the rear end to "slide out", thus turning the front end of the vehicle relatively sharply and unexpectedly. Such an oversteer condition is generally more difficult for most drivers to control or compensate for and can cause relatively rapid and unexpected deviation of the vehicle from the direction set by the steering wheel. A related phenomenon is that of dive/lift, wherein the front end of the vehicle tends to dive forward during braking, while the rear end lifts. Such lifting of the rear end generally leads to loss of traction in the rear wheels, which compromises braking performance.

The rolling motion of the body of the vehicle during a turn can also cause a lessening of the weight on the inside tire and a transfer of this weight to the outside tire. The gripping characteristics of tires are such that above a certain point, increased weight tends to decrease gripping ability. Thus, vehicle body roll can also contribute to understeer and oversteer conditions.

One requirement of any suspension system, or of any addition to a suspension system, is that additional weight be minimized. However, as mentioned above, typical anti-roll bars or stabilizer bars are relatively heavy, and may weigh in the area of 20 lbs. or more. Moreover, anti-roll bars are sensitive to single wheel impact or bumps. That is, when a single wheel of the suspension is impacted, an anti-roll bar will transfer its load to the body of the vehicle, causing a less comfortable ride. Thus, there is room for improvement over the anti-roll or stabilizer bar.

One particularly novel and useful stabilizing system is shown in U.S. Pat. No. 5,382,034 which is commonly assigned herewith. However, this system acts by transferring forces to the vehicle frame, whereas the present invention, as will be more fully described hereinbelow, advantageously operates by distributing forces in such a way that vehicle suspension components tend to be compensated for forces experienced during various vehicle maneuvers.

OBJECTS OF THE INVENTION

It is a general object of the invention to provide a novel and improved stabilizer system for use with a vehicle suspension.

A related object is to provide such a stabilizer system which adds but a minimum amount of weight to the vehicle and its suspension.

Another related object is to provide such a stabilizer system which is relatively simple and inexpensive to manufacture and assemble.

SUMMARY OF THE INVENTION

Briefly, and in accordance with the foregoing, the invention provides a stabilizer system for an automotive vehicle having a suspension including left and right suspension components, each of which suspension components rotates about a predetermined axis of rotation in response to movement of a portion of a vehicle body located above the suspension component in generally upward and downward directions relative to wheels of the vehicle, the stabilizer system comprising means defining first and second attachment points operatively coupled to each of the suspension components, the attachment points being located generally above and below the axis of rotation of the suspension component; first and second elongate flexible means for tensionably linking respective ones of the attachment points, the first elongate flexible means being operatively connected to and extending between the one of the attachment points located above the axis of rotation of the left suspension component and the one of the attachment points located below the axis of rotation of the right suspension component, and the second elongate flexible means being operatively coupled to and extending between the one of the attachment points located below the axis of rotation of the left suspension component and the one of the attachment points located above the axis of rotation of the right suspension component, each of the elongate flexible means passing freely and unobstructed between its operative connections to the respective attachment points.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements throughout the several views and in which:

FIG. 3 is an enlarged partial perspective view showing further details of a portion of FIG. 2;

FIG. 4 is an exploded perspective view showing further details of the structure shown in FIG. 3; and FIG. 5 is a partial elevation showing further details of a portion of FIG. 2.

DETAILED DESCRIPTION OF THE ILLUSTRATED EMBODIMENT

Figure 1:
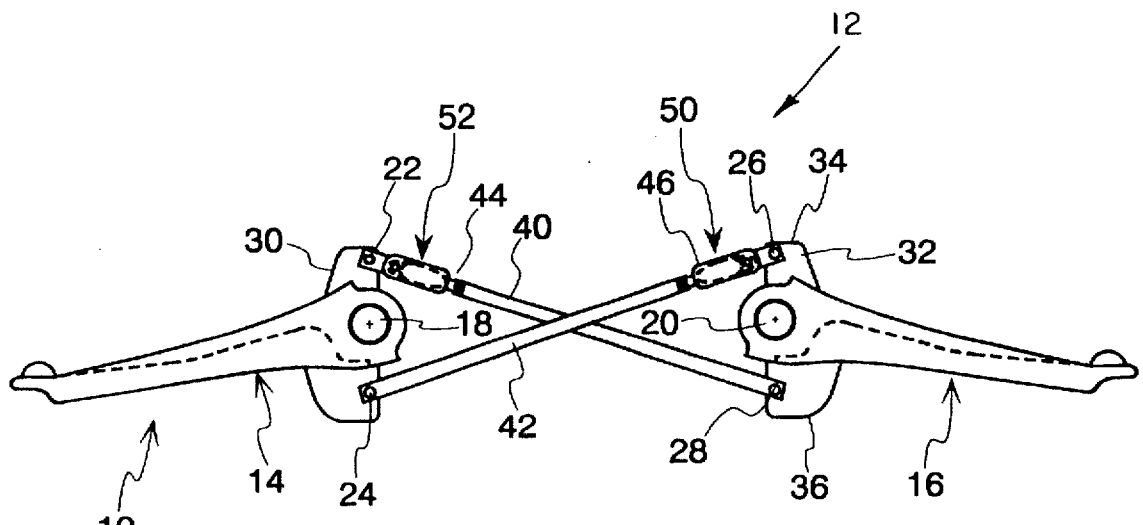
FIG. 1 is a partial elevation of a portion of a vehicle suspension system in connection with which the stabilizer system of the invention is advantageously employed.

Referring now to the drawings and initially to FIG. 1, there is shown a relevant portion of a vehicle suspension 10 in connection with which a stabilizer system 12 in accordance with the invention is advantageously utilized. As shown in FIG. 1, the vehicle suspension 10 includes a left suspension component 14 and a right suspension component 16. In the illustrated embodiment, these left and right suspension components 14 and 16 comprise control arms of an automotive vehicle, each of which is rotatable or pivotable about an axis of rotation 18, 20. Each of the suspension components or control arms 14, 16 rotates about its axis of rotation 18, 20 in response to movement of at least that portion of the vehicle body located above the suspension component in a generally upward and downward direction relative to the wheels of the vehicle (not shown) or a ground surface on which the wheels are supported. It should be understood that while control arms 14, 16 of an automotive vehicle such as a passenger automobile are shown in FIG. 1, the invention might be utilized with other suspension components which also rotate about some axis of rotation in response to upward and downward motion of a vehicle body. For example, in light trucks, shackle arms attach to leaf springs, and other types of suspensions might be provided on other types of vehicles.

The stabilizer system 12 of the invention includes means which define first and second attachment points 22, 24 and 26, 28 relative to, or operatively coupled to, each of the suspension components or control arms 14, 16. In accordance with the invention, these attachment points 22, 24 and 26, 28 are located generally above and below the associated axis of rotation 18, or 20 of the respective suspension components or control arms 14, 16. These locations above and below the axes of rotation 18, 20 are generally in the vertical direction. However, the attachment points may be located offset in the horizontal planes, so long as they define some offset in a vertical direction relative to the associated axis of rotation 18, 20. Thus, the points need not be located directly above and below the axis of rotation as shown in FIG. 1, but may be offset somewhat in the horizontal plane, so long as a vertical component of offset is also defined.

Figure 2:
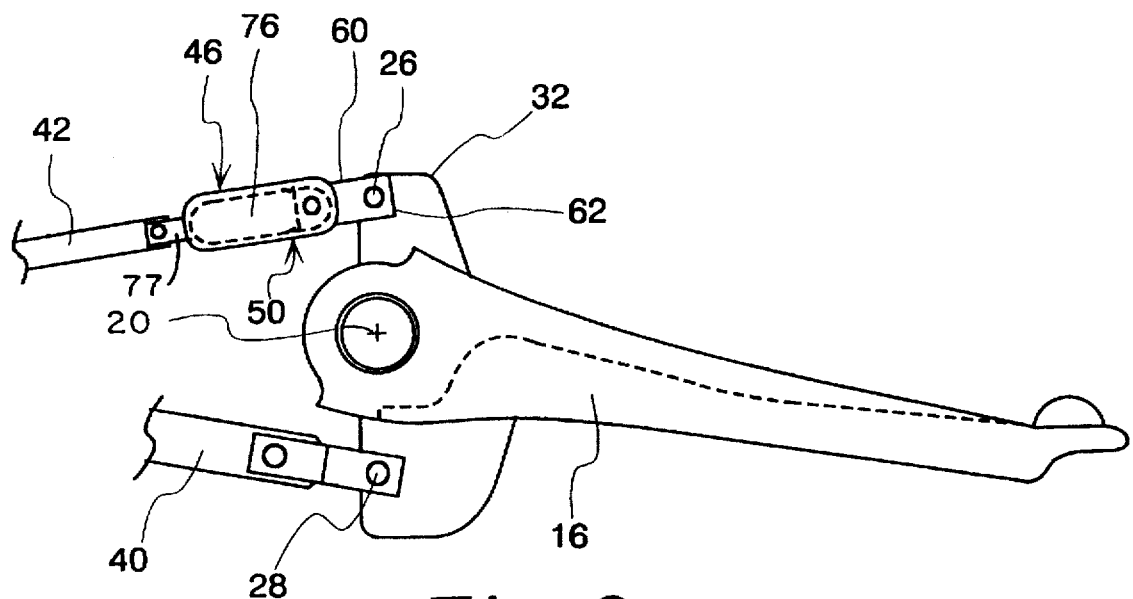
FIG. 2 is a partial elevational view illustrating further details of the stabilizer system of the invention.

In the illustrated embodiment, the attachment points 22, 24 and 26, 28 are defined by respective elongated links 30, 32 which are rigidly coupled to the respective control arms 14, 16 and extend transversely, in a generally vertical direction across the respective axes of rotation 18 and 20. The opposite extensions of the respective links 30 and 32 is such that each has respective first and second ends, for example, ends 34 and 36 with respect to the link 32 (see also FIG. 2), which extend oppositely outwardly relative to the associated axis of rotation, for example, the axis of rotation 20 with respect to the arm 16, as also seen in FIG. 2.

In accordance with the invention, first and second elongate flexible means or members or straps 40, 42 are operatively coupled for tensionably linking the respective attachment points 22, 24 and 26, 28 in the fashion shown in FIG. 1. In this regard, the first flexible member 40 is operatively coupled between the attachment point 22 above the axis of rotation 18 of the left suspension component 14 and the attachment point 28 which is located below the axis of rotation 20 of the right suspension component 16. On the other hand, the second elongate flexible member 42 is coupled between the attachment point 26 which is located above the axis of rotation 20 of the right suspension component or control arm 16 and the attachment point 24 which is located below the axis of rotation 18 of the left suspension component or control arm 14. Thus, the first and second elongate flexible means or members 40 and 42 cross each other at some point or area between the respective suspension components or control arms 14 and 16. Moreover, the attachment points 22, 24, 26, 28 and the elongate flexible members 40 and 42 are arranged such that they pass freely and unobstructed between their respective operative connections to the respective attachment points 22, 24, 26, 28.

In accordance with a preferred feature of the invention, each of the elongate flexible members 40 and 42 is also provided with resilient tensioning means, diagrammatically illustrated at reference numerals 44 and 46 in FIG. 1. In the embodiment illustrated in FIG. 2, the resilient tensioning means or structure 46 is illustrated as a part of a coupling structure 50 which also serves to couple the elongate flexible member or strap 42 to the attachment point 26. It will be understood, however, that the resilient means may be incorporated at one end or both ends of each of the elongate flexible members or straps 40 and 42, or at some point along the length of each of these elongate members or straps 40 and 42, without departing from the invention. Moreover, the use of some suitable material or composition of the elongate members or straps 40 and 42 might also provide a sufficient degree of resiliency to serve this purpose, such that the resilient tensioning means would be a part of or inherent in the properties of the elongate members or straps 40 and 42.

In this latter regard, in the illustrated embodiment each of the elongate flexible means or members 40, 42 preferably comprises an elongate strap of a flat, ribbon-like steel material, for example, a type of steel often utilized as steel strapping or banding material.

In the illustrated embodiment, the respective attachment points 22, 24 and 26, 28 are located equidistant from their associated pivot axes 18 and 20. In this configuration, the stabilizer system of the invention will act to control vehicle body roll in the same fashion as conventional stabilizer bars or anti-roll bars. However, it will be appreciated that the construction of the system of the invention 12 makes possible great weight savings over a conventional stabilizer bar. It is estimated that the stabilizer system of the invention will weigh on the order of 70% less than a solid stabilizer bar.

However, the attachment points 22, 24 and 26, 28 may also be offset with respect to their associated axes of rotation 18 and 20 without departing from the invention. Thus, one of the attachment points may be located farther from its respective axis of rotation than the other attachment point with respect to both suspension components or control arms 14 and 16. In the case where the attachment points are offset, the stabilizer system of the invention will also act to affect or control anti-lift and anti-dive conditions, dependent upon the configuration of the stabilizer system of the invention which is provided, that is, the length of the respective straps 40, 42, the amount of offset of the attachment points 22, 24, 26, 28 relative to the axes of rotation 18, 20 of the control arms 14, 16, pretensioning of the straps 40, 42, and the like.

Referring next to FIGS. 3 and 4, further details of the tensionable coupling means 46 incorporated in the coupling structure 50 of FIG. 2 are illustrated. This coupling structure 50 includes a housing 60 which is provided with a clevis mount 62 for rotatable or pivotal engagement with one of the attachment points 26 in the embodiment illustrated in FIG. 2. Of course, the clevis attachment 62 may also be attached to one of the other attachment points 22, 24, 28 without departing from the invention. To this end, the clevis 62 is provided with aligned through openings 64 for receiving a suitable pin or fastener 82 for coupling to the associated attachment point.

The housing 60 defines a hollow interior portion 66 which is sized for receiving an elongate, generally rectilinear compressible member 68, preferably of a relatively hard, rubber, neoprene, or other similar resilient, compressible rubber-like material. Also received within the hollow space 66 within the housing 60 is a small slider member 70, which has a generally centrally located through opening 72 which will run transversely of the housing 60 when the slider 70 is in place therein. The slider 70 is mounted for sliding movement within the housing 60 for generally compressing the compressible member 68 as it slides or is urged toward the member 68 in response to tension upon the associated strap 42 as the suspension members or control arms 14, 16 rotate relative to their axes of rotation 18 and 20.

In order to couple the respective straps 40, 42 to their associated housings 60, there is provided a strap-mounting clevis 76. The strap-mounting clevis 76 has an ear 77 extending from one end thereof which may be coupled to the strap by a fastener, or by welding or the like. The clevis portion of the strap-mounting clevis 76 is provided with aligned through openings 78 which are placed in alignment with the through opening 72 of the slider 70 and may receive a pin 80, or another suitable fastener therethrough. One such coupling assembly 50 employing the foregoing parts is utilized to couple the, end of strap 42 to attachment point 26, for example by use of the pin 82, and another such assembly 52 (see FIG. 1) is used to couple one end of strap 40 to attachment point 22, in the embodiment illustrated in FIGS. 1 and 2.

Referring to FIG. 5 in the illustrated embodiment, each of the opposite ends of the respective straps 40 and 42 is joined to the attachment points 24 and 28 by a clevis 90, pins 91 and a strap-mounting pad 92, to which the strap may be welded. However, the clevis 90 and pad 92 could be provided as a single part, if desired, eliminating one of the pins 91.

It will be appreciated that the components of the stabilizer system of the invention add relatively little additional weight to a vehicle. These components include the straps and the connecting assemblies. These parts are relatively few and relatively light in weight. Thus, it is estimated that these components in accordance with the invention might add on the order of 6 lbs. to total vehicle weight, as compared to conventional stabilizer bars or anti-roll bars which may weigh on the order of 20 to 25 lbs.

While particular embodiments of the invention have been shown and described in detail, it will be obvious to those skilled in the art that changes and modifications of the present invention, in its various aspects, may be made without departing from the invention in its broader aspect, some of such changes and modifications being matters of routine engineering or design, and others being apparent only after study. As such, the scope of the invention should not be limited by the particular embodiments and specific constructions described herein but should be defined by the appended claims and equivalents thereof. Accordingly, the aim in the appended claims is to cover all such changes and modifications as fall within the true spirit and scope of the invention.

The invention is claimed as follows:

1. A stabilizer system for an automotive vehicle having a suspension including left and right suspension components wherein each one of said suspension components rotates about a predetermined axis of rotation in response to movement of a portion of the vehicle located above the particular one of said suspension components in substantially upward and downward directions relative to the wheels of the vehicle, comprising:

means defining first and second attachment points operatively coupled to each one of said left and right suspension components wherein said first and second attachment points are located substantially above and below the axis of rotation of a respective one of said left and right suspension components; and first and second elongate flexibly bendable means for tensionably linking respective ones of said first and second attachment points, said first elongate flexibily bendable means being operatively connected to and extending between the one of said first and second attachment points located above said axis of rotation of said left suspension component and the one of said first and second attachment points located below said axis of rotation of said right suspension component, and said second elongate flexibly bendable means being operatively connected to and extending between the one of said first and second attachment points located below said axis of rotation of said left suspension component and the one of said first and second attachment points located above said axis of rotation of said right suspension component such that said first and second elongate flexibly bendable means cross each other at a point between the respective first and second attachment points, each of said elongate flexibly bendable means passing freely and unobstructed between its operative connections to the respective first and second attachment points.

2. A stabilizer system according to claim 1, wherein:

each one of said elongate flexibly bendable means comprises an elongate flat strap of steel material.

3. A stabilizer system according to claim 1, further comprising:

means for resiliently tensioning said first and second elongate flexibly bendable means.

4. A stabilizer system according to claim 3, wherein said means for resiliently tensioning said first and second elongate flexibly bendable means comprises:

a housing;

a compressible element mounted within said housing; and means for converting tensile forces in said first and second elongate flexibly bendable means to compressive forces upon said compressible element.

5. A stabilizer system as set forth in claim 4, wherein said means for converting said tensile forces to compressive forces comprises:

a slidable element slidably movable within said housing and adapted to engage said compressible element; and means interconnecting said slidable element to a respective one of said first and second elongate flexibly bendable means.

6. A stabilizer system as set forth in claim 5, wherein said interconnecting means comprises:

a clevis element having a first end portion thereof secured to a respective one of said first and second elongate flexibly bendable means, and a second end portion thereof partially encasing said housing and said compressible element disposed within said housing; and means connecting said second end portion of said clevis element and said slidable element.

7. A stabilizer system as set forth in claim 6, wherein:

first aperture means are defined within said slidable element;

second aperture means are defined within said second end portion of said clevis element; and said connecting means comprises a pin extending through said first and second aperture means of said slidable element and said clevis element.

8. A stabilizer system as set forth in claim 6, wherein:

said housing comprises a second clevis element for connecting said housing to a respective one of said left and right suspension components.

9. A stabilizer system as set forth in claim 4, wherein:

said housing comprises a clevis element for connecting said housing to a respective one of said left and right suspension components.

10. A stabilizer system according to claim 1 and further including resiliently tensionable means for joining at least one end of each of said elongate flexibly bendable means to one of said attachment points.

11. The stabilizer system according to claim 1 wherein the attachment points above and below the axes of rotation of the respective left and right suspension components are located equidistant from said axes rotation.

12. A stabilizer system for an automotive vehicle having a suspension including respective left and right control arms wherein each one of said left and right control arms is rotatable about an axis of rotation in response to movement of a portion of the vehicle located above the particular one of said control arm in substantially upward and downward directions relative to the wheels of the vehicle, comprising:

first and second elongated links wherein each one of said first and second elongated links is rigidly connected to one of said left and right control arms and extends transversely with respect to the axis of rotation thereof such that first and second ends of each one of said first and second elongated links extends oppositely outwardly relative to said axis of rotation; and first and second elongate flexible means for tensionably linking said first and second elongated links wherein said first elongate flexible means is operatively connected to and extends between said first end of said elongated link connected to said left control arm and said second end of said elongated link connected to said right control arm, and said second elongate flexible means is operatively connected to and extends between said first end of said elongated link connected to said right control arm and said second end of said elongated link connected to said left control arm, such that said first and second elongate flexible means cross each other at a point intermediate said first and second elongated links, and each one of said first and second elongate flexible means pass freely and unobstructed between its respective operative connections to said first and second elongated links.

13. A stabilizer system according to claim 12, wherein:

each one of said first and second elongate flexible means comprises an elongate flat strap of steel material.

14. A stabilizer system according to claim 13, wherein:

said first and second elongate flexible means are connected to said first and second elongated links at points equidistant from said axes of rotation of said left and right comtrol arms.

15. A stablilizer system according to claim 12 and further including resiliently tensionable coupling means for joining at least one end of each of said elongate flexible means to an end of one of the links.

16. A stabilizer system according to claim 15, wherein said resiliently tensionable coupling means comprises:

a housing;

a compressible element mounted within said housing; and means for converting tensile forces in said first and second elongate flexible means to compressive forces upon said compressible element.

17. A stabilizer system as set forth in claim 16, wherein said means for converting said tensile forces to compressive forces comprises:

a slidable element slidably movable within said housing and adapted to engage said compressible element; and means interconnecting said slidable element to a respective one of said first and second elongate flexible means.

18. A stabilizer system as set forth in claim 17, wherein said interconnecting means comprises:

a clevis element having a first end portion thereof secured to a respective one of said first and second elongate flexible means, and a second end portion thereof partially encasing said housing and said compressible element disposed within said housing; and means connecting said second end portion of said clevis element and said slidable element.

19. A stabilizer system as set forth in claim 18, wherein:

first aperture means are defined within said slidable element;

second aperture means are defined within said second end portion of said clevis element; and said connecting means comprises a pin extending through said first and second aperture means of said slidable element and said clevis element.

20. A stabilizer system as set forth in claim 18, wherein:

said housing comprises a second clevis element for connecting said housing to a respective one of said first and second elongated links.

* * * * *